J. W. DICKINSON, Jr.
DEMOUNTABLE WHEEL.
APPLICATION FILED JULY 7, 1915.

1,256,882.

Patented Feb. 19, 1918.

WITNESSES:
John Y. Phillips
A. E. Beck

INVENTOR
John W. Dickinson Jr.,
BY
ATTORNEYS

UNITED STATES PATENT OFFICE.

JOHN WESLEY DICKINSON, JR., OF LITTLE ROCK, ARKANSAS.

DEMOUNTABLE WHEEL.

1,256,882.  Specification of Letters Patent.  Patented Feb. 19, 1918.

Application filed July 7, 1915. Serial No. 38,499.

*To all whom it may concern:*

Be it known that I, JOHN W. DICKINSON, Jr., a citizen of the United States, and a resident of Little Rock, in the county of Pulaski and State of Arkansas, have invented an Improvement in Demountable Wheels, of which the following is a specification.

This invention is an improvement in demountable vehicle wheels and has particular reference to the hub mounting therefor.

An object of the invention is the provision of a hub upon which the wheel is adapted to be easily and quickly mounted and detached therefrom, the novel construction of the hub and wheel also rendering the latter interchangeable so that the same may be applied to both front and rear axles.

Another object is to provide a wheel of this character which is extremely simple in construction thus reducing the cost of manufacture thereof to a minimum and which is durable and effective in carrying out the purpose for which it is designed.

The inventive idea involved is capable of receiving a variety of mechanical expressions, one of which, for the purpose of illustrating the invention, is shown in the accompanying drawing, in which—

Figure 2:
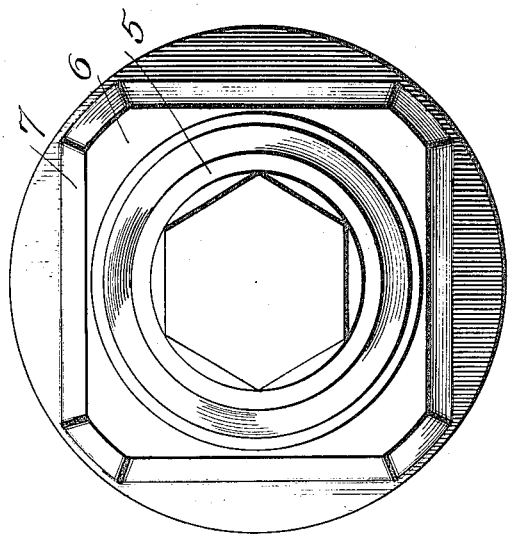
Fig. 2 is an enlarged end elevation of the hub of the wheel removed.
Figure 3:
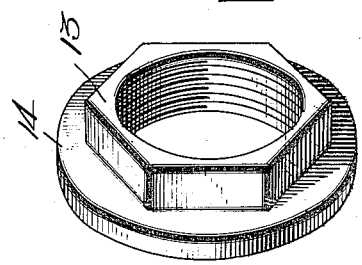
Fig. 3 is a perspective view of the means for retaining the wheel in position on the hub.
Figure 1:
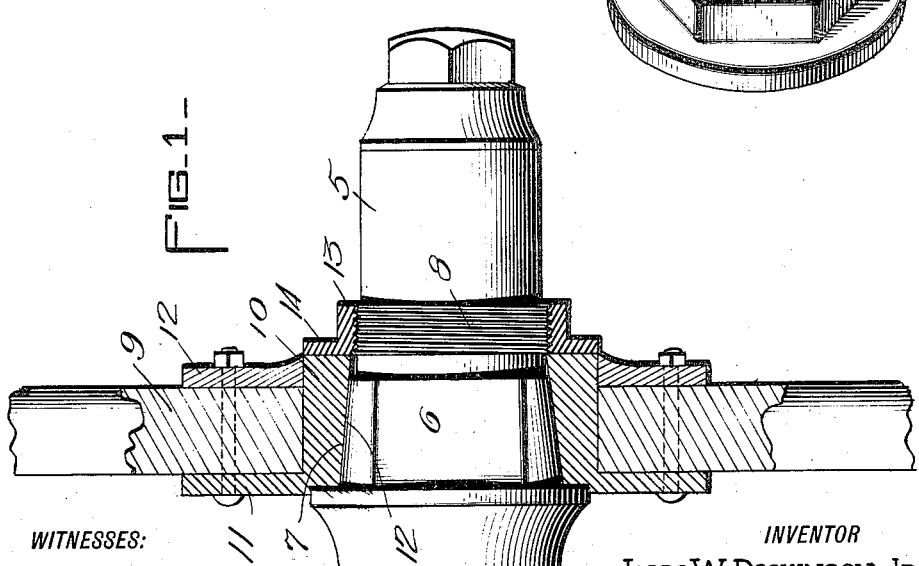
Figure 1 is a side elevation of the hub of a wheel, the latter being broken away and shown in section.

Referring more particularly to the accompanying drawing, in which like reference characters indicate similar parts, the numeral 5 indicates a hub member which is preferably employed in connection with automobiles and which is interiorly constructed to receive the anti-friction bearings of any preferred type (not shown). The hub member 5 is provided exteriorly and adjacent its inner end with a circular shoulder or flange as shown in Fig. 1, and an enlarged substantially rectangular portion generally indicated by 6 and having its peripheral surface tapered or inclined outwardly toward the end of the hub member 5 as indicated by the numeral 7. Spaced a slight distance from the outer edge of the portion 6 of the hub member the latter is provided with a plurality of screw threads 8 for a purpose which will appear in the course of this description.

The essential features of the wheel 9 embodied in this invention include a sleeve member 10 having an integral flange 11 which coöperates with the usual removable flange 12 to form sockets or spaces for the reception of the inner ends of the spokes, the inner face of flange 11 having an annular depression socket to receive and partly inclose the annular shoulder on the hub. The inner surface of the sleeve member 10 is provided with a tapering bore 12' and is shaped to coöperate with the tapering portion 6 of the hub member 5. It will be seen from the foregoing description that when the wheel 9 is mounted upon the hub member 5 the complemental tapering surface thereof will cause the wheel to wedge upon the hub member whereby to provide a secure mounting therefor.

In order to prevent accidental displacement of the wheel from the hub, a locking device 13 in the form of an internally threaded nut is adapted to be mounted upon the screw threads 8 and is provided with an annular flange 14 which engages the adjacent end of the sleeve member 10 and thus securely retains the same in its relative position on the hub.

The circumference of the flange 14 is flush with the circumference of the sleeve 10 so that the outer spoke flange 12 which fits entirely on the sleeve 10, may easily and quickly be removed without any manipulation of the nut 13.

It will be apparent from this construction that the wheel 9 may be very easily and quickly demounted and replaced by another wheel and that, owing to the tapering construction contemplated by the invention, wheels having sleeve members of slightly varying sizes may be readily mounted on the hub member.

It will also be apparent that a broken spoke can immediately and easily be removed from the wheel without removing same from the hub or even touching the retaining nut 13.

I claim:

A demountable wheel comprising a hub member provided at its inner end with an upstanding annular flange and a portion of polygonal formation externally extending forwardly from said flange and a cylindrical portion in advance of the polygonal portion, the polygonal portion tapering outwardly, a cylindrical extension in advance of the above mentioned cylindrical portion, the rear end of the cylindrical extension being externally threaded a slight distance in advance of the cylindrical portion, a spoke carrying sleeve having an upstanding flange at its inner end and provided with an annular recess or socket to fit the aforesaid annular flange at the inner portion of the hub to constitute a sand band, said sleeve having a width greater than the extent of the polygonal formation, and having a mating polygonal bore to slide and fit on the polygonal portion of the hub, spokes having their inner ends held on the sleeve and against the flange thereof, an outer spoke retaining band having a circular bore of the same diameter as the outer diameter of the sleeve and adapted to be detachably held against the spokes and to the annular flange of the sleeve, and a threaded nut screwed on the threaded portion of the hub, and against the outer end of the sleeve to force it into close contact with the polygonal portion of the hub, the unthreaded cylindrical portion of the hub in advance of said threaded portion adapted to receive the nut when unscrewed, the greatest diameter of the active face of said nut being no greater than the outer diameter of the sleeve whereby spokes may be removed or replaced without removing the sleeve from the hub.

JNO. WESLEY DICKINSON, Jr.

Witnesses:
    THOMAS W. SLOAN,
    JNO. A. DICKINSON.